UNITED STATES PATENT OFFICE.

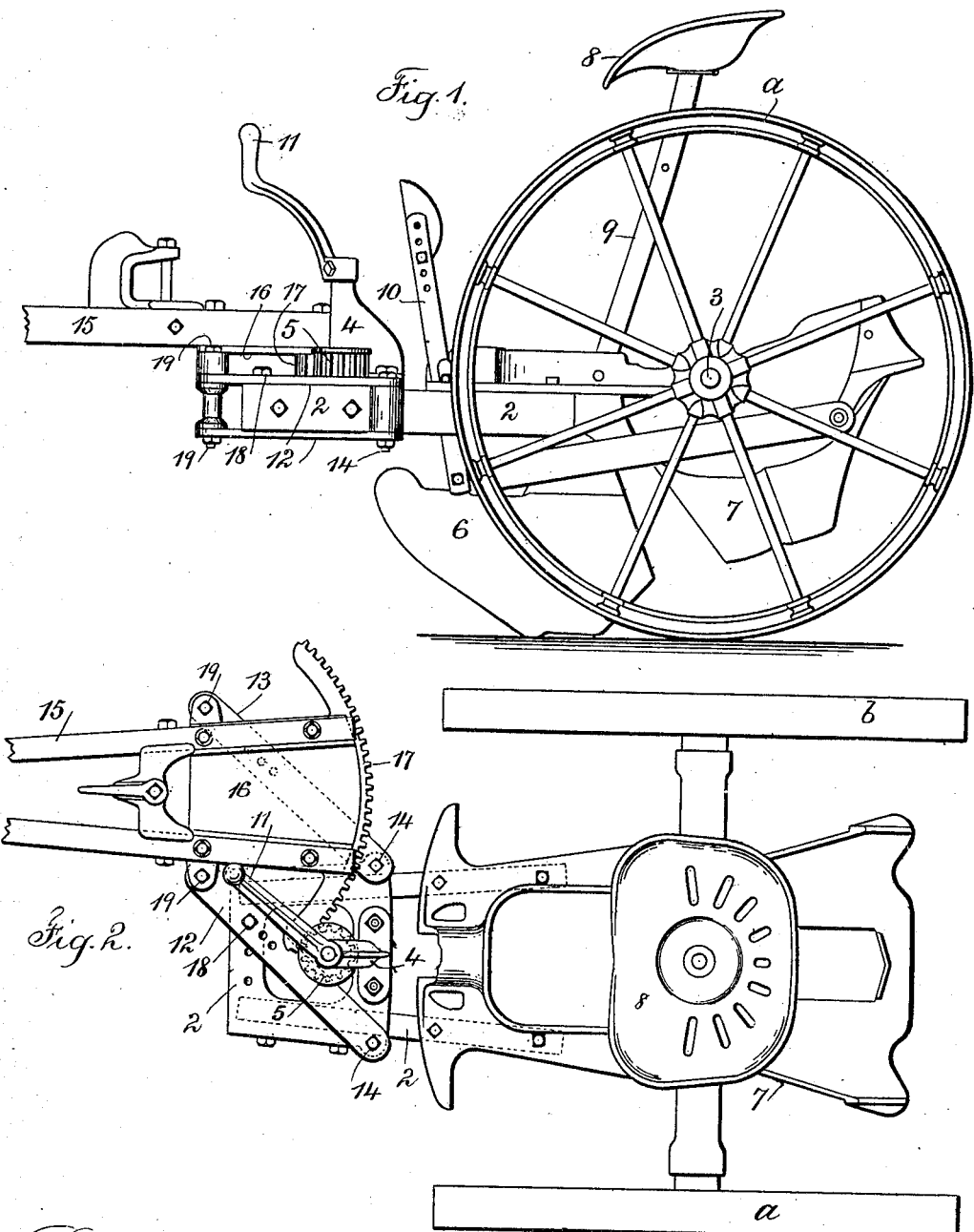

LEWIS AUGUSTUS ASPINWALL, OF JACKSON, MICHIGAN, ASSIGNOR TO ASPINWALL MANUFACTURING CO., OF JACKSON, MICHIGAN, A CORPORATION OF MICHIGAN.

AGRICULTURAL IMPLEMENT.

No. 872,316.     Specification of Letters Patent.     Patented Nov. 26, 1907.

Original application filed April 9, 1906, Serial No. 310,601. Divided and this application filed April 12, 1907. Serial No. 367,727.

*To all whom it may concern:*

Be it known that I, LEWIS AUGUSTUS ASPINWALL, a citizen of the United States, residing at Jackson, in the county of Jackson and State of Michigan, have invented an Improvement in Agricultural Implements, of which the following is a specification.

My present invention relates to improvements in pole devices for agricultural implements generally and particularly to potato planters, with the object of adjustably changing the line of draft to accommodate the position of the machine and the walking position of a horse or team of horses to the rows of plants in a field so that the animal or animals will walk between the rows without any tendency to walk on the plants or ridges and this regardless of the width of the rows.

This application is a division of an application for Letters Patent filed by me April 9, 1906, Serial No. 310,601.

I have found that in certain places the rows of potatoes are planted much closer together than in other places and to prevent the horses walking on the ridge of the previously planted row, I employ devices for changing the line of draft of the machine. These devices consist essentially of a platform supporting a divided pole connected by parallel bars to a platform of the frame of the machine and operatively connected by a segment rack, pinion and a handle, together with locking devices for fixing the predetermined relations of these parts, all of which is hereinafter more particularly described.

In the drawing, Figure 1 is a side elevation representing the devices of my invention at the forward part of the machine and Fig. 2 is a plan of the same. These figures illustrate so much of an agricultural implement as may be necessary to identify the devices of my present improvement therewith.

In the drawing I have shown a frame 2, a main axle 3 and wheels *a b* mounted on the ends of the main axle, a plow 6 supported in an adjustable relation to the machine by a bar 10 pivoted to the plow and adapted to be adjustably supported from the frame of the machine. I have also shown a seat 8 for the driver, supported upon a seat standard 9 secured to the frame of the machine, and a hopper 7 especially adapted for use in connection with a potato planter, and while I have shown a plow 6 for opening the soil and a hopper 7 for the reception of the potatoes to be planted, my invention is not to be limited to this form of an agricultural implement, as the same is adapted for use in connection with any agricultural implement where it is desired that the functions of this machine be likewise performed.

The forward end of the frame 2 of the machine is preferably constructed as tapering and at this forward end I place a bearing bracket 4 through which passes a short shaft with a pinion 5 on the lower end of the short shaft and a handle 11 secured to the upper or projecting end of the short shaft; the shaft and pinion being turned by the handle. To this forward end of the frame 2 I secure pairs of parallel bars 12 13 at pivots 14 near the opposite edges and these bars move over the upper and lower faces of the frame 2.

To the back ends of the divided pole 15 I secure a platform 16 preferably of metal and the free ends of the pairs of parallel bars 12 13 are connected at opposite pivots 19 to the said platform 16. The platform 16 is provided at its back edge with a segment rack 17, the teeth of which mesh with the teeth of the pinion 5.

There is a series of holes in the forward portion of the frame 2 and a series of holes in corresponding positions in each of the upper parallel bars 12 13 and a locking pin 18 is employed so as to pass through one of the holes either of the bar 12 or the bar 13 into one of the holes in the forward portion of the frame 2 so as to lock the pole and platform 16 in a predetermined relation with the frame 2 and the potato-planting machine, or other agricultural implement.

Fig. 2 shows the extreme position and the relation of these parts with reference to one another, and the proportions of the parts are so arranged and formed that when the pin 18 is withdrawn the handle 11 and pinion 5 may be rotated so as to move the segment rack 17, the platform 16 and divided pole 15 and swing the same with reference to the frame 2 of the potato-planter upon the parallel bars 12 13 from the position Fig. 2 nearer to the center or over to the opposite side.

Supposing the position, Fig. 2 to be the correct position for use, in passing down and planting a field in one direction, to return and plant the next row especially where the rows are put as close as twenty inches apart, it will be found necessary to swing the divided pole as much to the opposite side of the frame 2 as it is swung to one side as shown in Fig. 2, and with each return over the field the position of the pole is to be changed so that the horses in traveling may not disturb the last made row of potatoes or seeds planted or rows of plants as cultivated.

It will be apparent that with the pole thrown to one side as hereinbefore described, that there is a slight side draft and this is compensated for by the position of the bars which are pivoted slightly closer at the front, indirectly causing the plow to point slightly toward the side of the line of draft and in this way the machine will run true although possibly it will take a little more power than if running direct and straight ahead.

I claim as my invention:

1. In a seed planter or cultivator, the combination with the main frame thereof and the pole structure to which the horses are attached, of means connecting said parts so that the relation of the pole to the frame can be changed at the pleasure of the operator and a parallel movement be imparted to the pole from one side to the other of the longitudinal center of the machine, means for effecting this change with regular progressive movement and means for locking the parts in their predetermined position.

2. In a seed-planter or cultivator, the combination with the forward portion of the main frame and a pole to which the horses are attached, of parallel bars pivotally connected at their respective ends to the forward portion of the frame and to the pole structure whereby the pole structure is given a swinging relation to the frame, a pinion and segment rack structure connected respectively to the parts for effecting the swinging movement of the pole and means for securing the pole structure in a predetermined relation to the frame.

3. In a seed-planter or cultivator, the combination with the forward part of the frame structure of the planter, of a bearing bracket 4 secured thereto, a short shaft passing through said bearing bracket, a pinion on the lower end of said shaft and a handle on the upper end for turning the shaft and the pinion, a pole structure to which the horses are to be attached, a frame structure upon which the pole structure is mounted, a segment gear on the end of the pole structure meshing with the aforesaid pinion and the position of which is adapted to change the relation of the pole structure to the frame of the machine and devices pivotally connecting the frame structure and pole and providing for the swinging movement.

4. In a seed-planter or cultivator, the combination with the forward part of the frame structure of the planter, of a bearing bracket 4 secured thereto, a short shaft passing through said bearing bracket, a pinion on the lower end of said shaft and a handle on the upper end for turning the shaft and the pinion, a divided pole structure 15, a platform 16 to which the ends of the divided pole structure are secured, a segment rack 17 at the back edge of said frame meshing with the aforesaid pinion, parallel bars 12 13, at one end connected to the frame at opposite sides of the aforesaid bracket and at the other ends to opposite sides of the platform 16, thus pivotally connecting the divided pole structure to the frame of the planter, and a locking pin adapted to pass through a hole formed in either of the parallel bars 12 13 into holes formed in the frame of the machine for locking the divided pole structure in a predetermined relation to the frame of the machine.

5. In a seed planter or cultivator, the combination with the main frame thereof and the pole structure to which the horses are attached, of devices pivotally connected to and connecting the pole and main frame so as to provide a swinging relation by which a movement is imparted to the pole parallel with the longitudinal center of the machine and at either side of said center, means manually operated for swinging the pole and means for securing the pole to the frame in the desired relation.

6. In a seed-planter or cultivator, the combination with the main frame thereof and the pole structure to which the horses are attached, of pairs of similar devices pivotally connected to each other and to the main frame and pole to swing the pole with reference to the frame through a predetermined arc, means connecting the pole and frame together for progressive manual operation and means for securing the pole to the frame in the desired relation.

Signed by me this second day of April 1907.

LEWIS AUGUSTUS ASPINWALL.

Witnesses:
 GEO. N. WHITNEY,
 C. G. ROWLEY.